(12) United States Patent
Miyatake et al.

(10) Patent No.: US 10,352,323 B2
(45) Date of Patent: Jul. 16, 2019

(54) METHOD FOR FORMING HOLE-PROCESSED CAST, CAST CASING, AND SCREW COMPRESSOR CASING

(71) Applicant: Kobe Steel, Ltd., Hyogo (JP)

(72) Inventors: Toshiyuki Miyatake, Hyogo (JP); Tomoya Yonetsu, Hyogo (JP)

(73) Assignee: Kobe Steel, Ltd., Hyogo (JP)

( * ) Notice: Subject to any disclaimer, the term of this patent is extended or adjusted under 35 U.S.C. 154(b) by 274 days.

(21) Appl. No.: 15/114,146

(22) PCT Filed: Nov. 27, 2014

(86) PCT No.: PCT/JP2014/081463
§ 371 (c)(1),
(2) Date: Jul. 26, 2016

(87) PCT Pub. No.: WO2015/114932
PCT Pub. Date: Aug. 6, 2015

(65) Prior Publication Data
US 2017/0002813 A1   Jan. 5, 2017

(30) Foreign Application Priority Data
Jan. 30, 2014 (JP) .................. 2014-015951

(51) Int. Cl.
*F04C 18/16* (2006.01)
*B22C 9/02* (2006.01)
(Continued)

(52) U.S. Cl.
CPC .............. *F04C 18/16* (2013.01); *B22C 9/02* (2013.01); *B22C 9/24* (2013.01); *B23B 35/00* (2013.01);
(Continued)

(58) Field of Classification Search
CPC .. F04C 18/16; F04C 2240/30; F04C 2230/21; F04C 2230/10; F01C 21/10; B23B 41/00; B23B 35/00; B23B 2228/21; B22C 9/02; B22C 9/24

See application file for complete search history.

(56) References Cited

FOREIGN PATENT DOCUMENTS

JP    52-111083 A    9/1977
JP    56-131819 A    10/1981
(Continued)

OTHER PUBLICATIONS

International Search Report issued in PCT/JP2014/081463; dated Feb. 24, 2015.
(Continued)

*Primary Examiner* — Ryan J. Walters
(74) *Attorney, Agent, or Firm* — Studebaker & Brackett PC (57) ABSTRACT

A method for forming drilled cast which includes drilling with a drill so as to provide communication with a cast hole includes a casting step and a drilling step. The casting step is to cast a cast having a cast hole which includes a flat inner wall surface in which width of a position to be drilled with the drill is obtained by adding first length H1 serving as a manufacturing error range of the cast to a diameter D of the drill, which is a second length H2. The drilling step is to form a through hole providing communication between an interior of the cast hole and an exterior of the cast through the flat inner wall surface with the drill.

8 Claims, 7 Drawing Sheets

(51) Int. Cl.
*B22C 9/24* (2006.01)
*B23B 35/00* (2006.01)
*F01C 21/10* (2006.01)
*B23B 41/00* (2006.01)

(52) U.S. Cl.
CPC .............. *B23B 41/00* (2013.01); *F01C 21/10* (2013.01); *B23B 2228/21* (2013.01); *F04C 2230/10* (2013.01); *F04C 2230/21* (2013.01); *F04C 2240/30* (2013.01)

(56) References Cited

FOREIGN PATENT DOCUMENTS

| | | | |
|---|---|---|---|
| JP | S62-63004 | A | 3/1987 |
| JP | 62-061955 | U | 4/1987 |
| JP | 2000-140994 | A | 5/2000 |
| JP | 2009-243404 | A | 10/2009 |
| JP | 2010-014074 | A | 1/2010 |
| JP | 2012-011477 | A | 1/2012 |
| JP | 2012011477 | * | 1/2012 ............. B23B 35/00 |

OTHER PUBLICATIONS

Written Opinion issued in PCT/JP2014/081463; dated Feb. 24, 2015.

Notification of Transmittal of Translation of the International Preliminary Report on Patentability and Translation of Written Opinion of the International Searching Authority; PCT/JP2014/081463 dated Aug. 11, 2016.

\* cited by examiner

METHOD FOR FORMING HOLE-PROCESSED CAST, CAST CASING, AND SCREW COMPRESSOR CASING

CROSS-REFERENCE TO RELATED APPLICATIONS

This is a national phase application in the United States of International Patent Application No. PCT/JP2014/081463 with an international filing date of Nov. 27, 2014, which claims priority of Japanese Patent Application No. 2014-015951 filed on Jan. 30, 2014 the contents of which are incorporated herein by reference.

TECHNICAL FIELD

The present invention relates to a method for forming drilled cast, a cast casing, and a screw compressor casing.

BACKGROUND ART

Generally, provided in a screw compressor main body casing is a flow passage (oil feeding flow passage) for feeding oil for the purpose of lubrication and cooling of bearings, gears, and the like. Although there are several points that require oil feeding, oil is fed from one point for reducing number of pipes. Thus, in order to be capable of supplying oil to all the points that require oil feeding, the oil feeding flow passage may sometimes be formed by connecting a plurality of drill holes. At that time, the oil feeding flow passage may sometimes be formed by a long hole with "length L/diameter D" being 6 or more, and a relatively short hole branching from the long hole. The long hole is provided in a projecting manner by a long drill. However, processing by the long drill requires not only a specific tool but also a long processing time, and hence is not favorable in productivity.

The problem of the processing time can be solved by providing the oil feeding flow passage (respective holes) by casting out. However, it may sometimes be impossible to change all the plurality of drill holes into cast holes because a core is not easily installed depending on positions of the holes.

The problem of installment of the core can be solved by additionally processing a drill hole at a place where the core is not easily installed in a cast. However, in a case where the cast hole is displaced due to casting precision, it is thought that a processing position of the drill hole with respect to the cast hole is relatively displaced from a designed position. In such a case, a state of contact with an object becomes non-uniform in the circumferential direction of the drill, and processing resistance of the drill becomes different in the radial direction of the drill (mainly, a difference is generated in radial reactive force to the drill). Thereby, run-out of the drill is generated. The run-out of the drill is more easily generated with the longer drill. Due to this run-out, the drill is damaged, and the productivity is deteriorated. Thus, a processing object requires a structure for preventing the run-out of the drill.

Figure 7A:
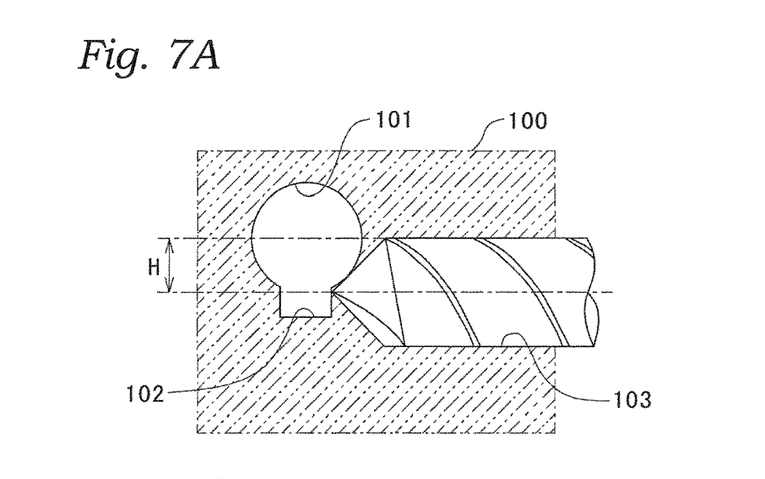
FIG. 7A is a sectional view showing a conventional structure for preventing a drill run out.

JP 2012-11477 A discloses a structure for preventing drill run-out at the time of drill hole processing by providing a rectangular recessed groove 102 along the longitudinal direction of a first hole 101 in the first hole 101 of a transmission case 100 as shown in FIG. 7A. However, the structure cannot deal with a case where center of a second hole 103 provided in a projecting manner by drill-processing passes through center of the first hole 101 manufactured by casting out.

Figure 7B:
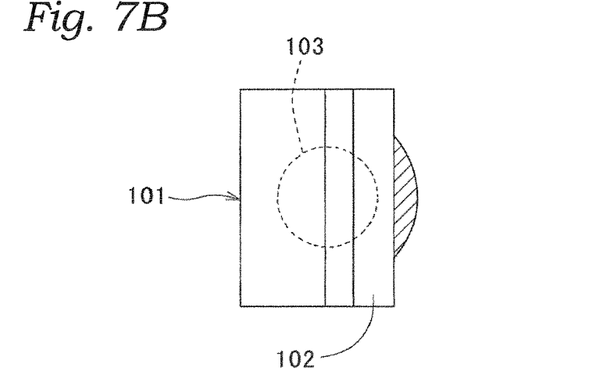
FIG. 7B is partial view of a large-sized cast with a first hole and a second hole decentered with the first hole.

As shown in FIG. 7B, depending on a place to which the present technique is applied, by decentering the center of the second hole 103 with respect to the center of the first hole 101 to the inside of a range of the rectangular recessed groove 102 which is out of a range of the first hole 101, the cast is increased in size and a cost disadvantage is caused.

Figure 7C:
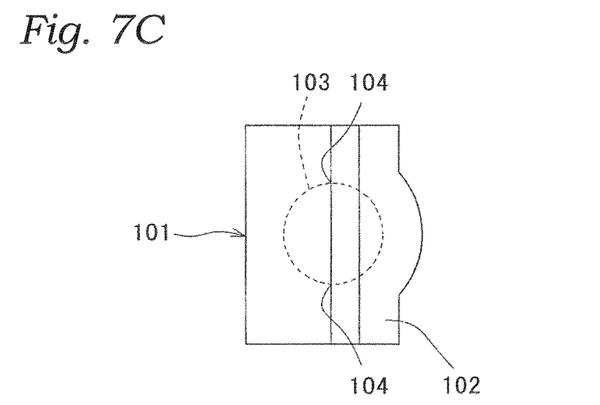
FIG. 7C shows a position where a projection is formed.
Figure 7D:
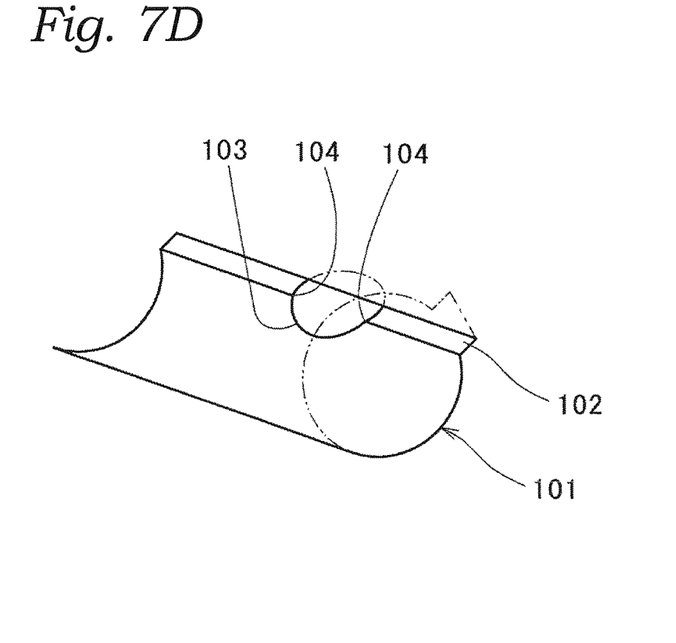
FIG. 7D shows a position where a projection is formed.

Normally, the cast hole is manufactured by using the core. However, it is highly predictable that the core is displaced at the time of pouring. In a case where the first hole 101 serving as the cast hole is displaced as shown in FIGS. 7C and 7D, a projection 104 is formed. In a case where a liquid such as oil flows through the hole, the projection 104 is broken by resistance of the liquid and flows to the downstream side. Thereby, there is a fear that an oil feeding nozzle is clogged and precision parts such as bearings are damaged, so that a decrease in quality might be caused.

SUMMARY OF THE INVENTION

Problems to be Solved by the Invention

It is an object of the present invention to avoid damage to a drill during drilling of a cast due to run-out of the drill, so that a low cost property and quality can be improved without deteriorating productivity.

Means for Solving the Problems

As a means for solving the problems, the present invention provides a method for forming a drilled cast which includes drilling with a drill so as to provide communication with a cast hole, comprising a casting step of casting a cast having the cast hole which includes a flat inner wall surface in which width of a position to be drilled with the drill is obtained by adding a first length H1 serving as a manufacturing error range of the cast to a diameter D of the drill, the width being a second length H2, and a drilling step of drilling with the drill to form a through hole providing communication between an interior of the cast hole and an exterior of the cast through the flat inner wall surface.

The drilling step is a step of drilling with the drill so as to provide communication with the cast hole at an intermediate position in the axial direction, and also a step of forming the through hole providing communication between the interior of the cast hole and the exterior of the cast through the flat inner wall surface with the drill whose rotation axis is positioned on an extending line in the direction orthogonal to an imaginary center line of the cast hole in a case where displacement of the cast hole with respect to the cast is supposed not to be generated in the casting step. The drilling step is form the through hole in which depth of providing communication between the interior of the cast hole and the exterior of the cast is six times or more than the diameter D of the drill.

According to the present method, length or width of one side of the flat inner wall surface formed in the cast hole has the second length H2 obtained by adding the first length H1 serving as the manufacturing error range of the cast to the diameter D of the drill or more. Thus, even in a case where a manufacturing error is generated in a position of the cast hole, the through hole can be reliably provided in the cast hole through the flat inner wall surface. That is, in the drilling step, run-out of the drill due to a difference in processing resistance of the drill can be prevented, so that damage to the drill can be avoided and a hole requiring a long processing time for drill-processing can be replaced with the cast hole not requiring the processing time. Thereby, deterioration of productivity can be avoided. The flat inner wall surface is formed within the manufacturing error range of casting set in consideration with displacement of the cast hole. Thus, the through hole can be provided in a projecting manner so as to be positioned within a range of the flat inner wall surface of the cast hole. Therefore, there is no need for providing extra thickness to an outer surface of the cast, so that an increase in size of the cast can be avoided. Consequently, a low cost property can be improved. The drill-processing can be performed to the flat inner wall surface of the cast hole. Thus, formation of a projection shape in the flat inner wall surface can be avoided. Therefore, clogging of an oil feeding nozzle due to breakage of the projection shape, damage to precision parts such as bearings, and the like can be avoided, so that a decrease in quality of the device can be avoided. As described above, the damage to the drill during drilling of the cast due to the run-out of the drill, so that the low cost property and the quality can be improved without deteriorating the productivity.

It should be noted that the method includes the drilling step of forming the through hole in which the depth of providing communication between the interior of the cast hole and the exterior of the cast within the range of the flat inner wall surface is six times or more than the diameter D of the drill. Thus, the run-out of the drill can be suppressed. Therefore, in a case where the through hole is provided so as to pass through the cast hole and a drill hole (another through hole) separately passing through the above through hole communicates on the leading end side of the above through hole, displacement between the through holes can also be suppressed.

In a case where third length serving as axial length of the cast hole is L, the third length L may be six times or more than the diameter D of the drill. According to this method, since the cast hole is formed by casting out, by using a long drill in the drill-processing, even a long hole requiring a long processing time can be formed without deteriorating the productivity.

Preferably, the cast hole is formed by using a core. According to this method, the cast hole can be easily formed in the cast.

Preferably, the cast hole is formed by using a full-mold casting process. According to this method, formation of a taper part in a wall surface of the cast hole can be eliminated. Therefore, the cast hole having the same sectional shape can be made in the cast. Since the cast with favorable size precision can be manufactured, thickness of the cast can also be suppressed, and cost can be suppressed to a minimum.

Preferably, the cast hole is formed by using a core passing through the cast. In this case, the first length H1 serving as the manufacturing error range of the cast may be set to be 4 mm at a maximum, preferably 2 mm to 4 mm. According to this method, displacement of the core at the time of pouring can be suppressed. Therefore, the relatively long cast hole (for example, a hole whose third length L is six times or more than the second length H2) can be easily formed in the cast.

Preferably, the cast hole is formed by using an evaporative pattern passing through the cast in the full-mold casting process. In this case, the first length H1 serving as the manufacturing error range of the cast may be set to be 4 mm at a maximum, preferably 1.5 mm to 3 mm. According to this method, the cast hole with little displacement can be formed. Therefore, the relatively long cast hole (for example, a hole whose third length L is six times or more than the second length H2) can be easily formed in the cast. Since the cast hole is easily formed so as to have the same sectional shape, length of one side in a section of the cast hole can be suppressed to a minimum.

As a means for solving the above problems, a screw compressor casing according to the present invention is a cast casing drilled with a drill so as to provide communication with a cast hole, comprising, a cast hole including a flat inner wall surface in which width of a position to be drilled with the drill has at least a second length H2 obtained by adding a first length H1 serving as a manufacturing error range of a cast to a diameter D of the drill, and a through hole formed by drilling with the drill, the through hole providing communication between an interior of the cast hole and an exterior of the cast through the flat inner wall surface Since the through hole is processed with the drill, the formation of the projection shape in the flat inner wall surface of the cast hole can be avoided. Therefore, the clogging of the oil feeding nozzle due to the breakage of the projection shape, the damage to the precision parts such as bearings, and the like can be avoided, so that the decrease in the quality of the device can be avoided.

As another means for solving the above problems, the present invention provides a cast casing drilled with a drill so as to provide communication with a cast hole, comprising, a cast hole including a flat inner wall surface in which width of a position to be drilled with the drill has at least a length obtained by adding a first length H1 serving as a manufacturing error range of a cast to a diameter D of the drill, which is a second length H2, and a through hole formed by drilling with the drill, the through hole providing communication between an interior of the cast hole and an exterior of the cast through the flat inner wall surface. The through hole is provided so as to communicate with the cast hole at an intermediate position in the axial direction, and drilled with the drill whose rotation axis is positioned on an extending line in the direction orthogonal to an imaginary center line of the cast hole in a case where displacement of the cast hole with respect to the cast casing is supposed not to be generated in a casting step. Depth of the through hole providing communication between the interior of the cast hole and the exterior of the cast is six times or more than the diameter D of the drill.

Anther aspect of the present invention provides a screw compressor casing which is a cast casing drilled with a drill so as to provide communication with a cast hole at an intermediate position in the axial direction, the screw compressor casing comprising, a cast hole formed by using an evaporative pattern passing through a cast in a full-mold casting process, the cast hole including a flat inner wall surface in which width of a position to be drilled with the drill has at least a length obtained by adding a first length H1 of 1.5 mm to 3 mm as a manufacturing error range of the cast to a diameter D of the drill, which is a second length H2, and a through hole formed by drilling with the drill in the direction orthogonal to an imaginary center line of the cast hole in a case where displacement of the cast hole with respect to the cast casing is supposed not to be generated in a casting step, the through hole providing communication between an interior of the cast hole and an exterior of the cast through the flat inner wall surface. The depth of through hole providing communication between the interior of the cast hole and the exterior of the cast through the flat inner wall surface is six times or more than the diameter D of the drill.

According to these configurations, since the cast hole passing through the cast is formed, the displacement of the cast hole can be suppressed. The through hole is processed in the flat inner wall surface of the cast hole with the drill. Thus, there is no need for providing extra thickness to the outer surface of the cast, so that the increase in the size of the cast can be avoided, and the clogging of the oil feeding nozzle due to the breakage of the projection shape, the damage to the precision parts such as bearings, and the like can be avoided. Therefore, the low cost property and the quality of the device can be improved. Since the cast hole not requiring the processing time is at least provided, the deterioration of the productivity can be avoided. It should be noted that in a case where the through hole is provided so as to pass through the cast hole and a drill hole (another through hole) separately passing through the above through hole communicates on the leading end side of the above through hole, the displacement between the through holes can also be suppressed.

In a case where the third length serving as the axial length of the cast hole is L, the third length L may be six times or more than the diameter D of the drill. According to this configuration, since the cast hole is formed by casting out, by using the long drill in the drill-processing, even a long hole requiring a long processing time can be formed in the compressor casing without deteriorating the productivity.

It should be noted that the method includes the drilling step of drilling the through hole in which the depth of providing communication between the interior of the cast hole and the exterior of the cast within the range of the flat inner wall surface is six times or more than the diameter D of the drill. Thus, the run-out of the drill can be suppressed. Therefore, in a case where the through hole is provided so as to pass through the cast hole and a drill hole (another through hole) separately passing through the above through hole communicates on the leading end side of the above through hole, the displacement between the through holes can also be suppressed.

Effect of the Invention

According to the present invention, the damage to the drill during the drilling of the cast due to the run-out of the drill is avoided, so that the low cost property and the quality can be improved without deteriorating the productivity.

MODE FOR CARRYING OUT THE INVENTION

Hereinafter, a screw compressor casing (cast) for implementing a method for forming drilled cast of the present invention will be described with reference to the drawings. It should be noted that in the description, the upper and lower sides of the paper plane will be called as the upper side and the lower side, and the left and right sides will be called as the sides for convenience sake.

First Embodiment

Figure 1A:
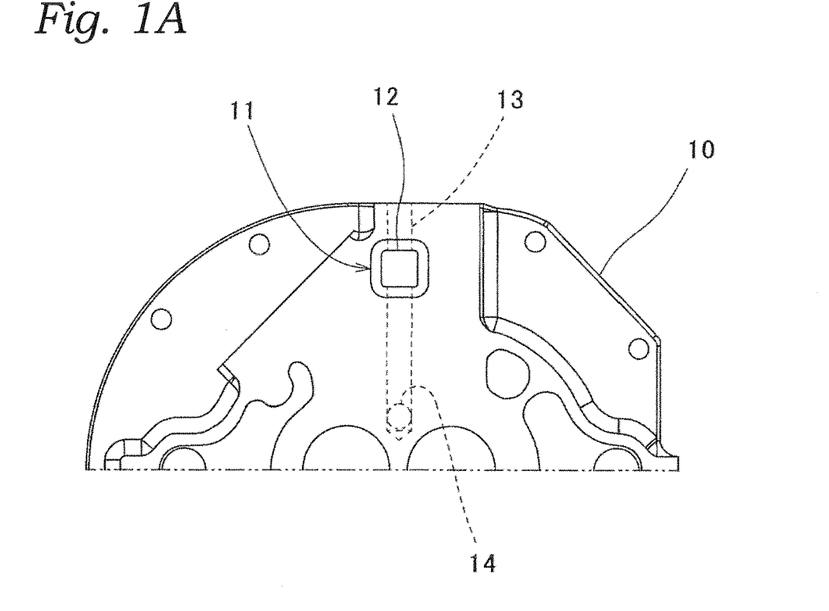
FIG. 1A is a partial front view of a part of a casing of a screw compressor to which a method for forming drilled cast according to the present invention is applied.
Figure 1B:
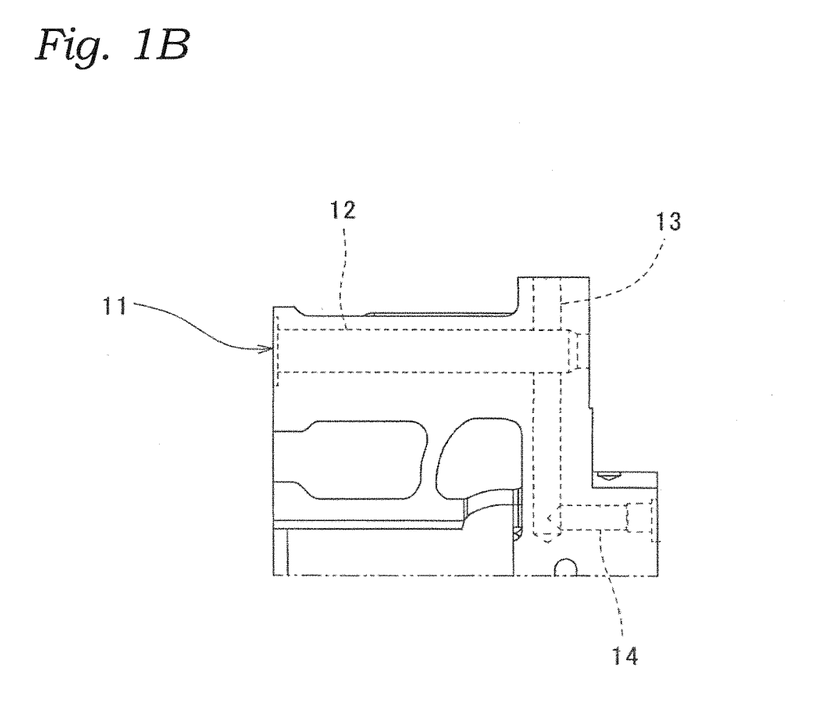
FIG. 1B is a partial side view of the casing of the screw compressor to which the method for forming drilled cast according to the present invention is applied.

FIGS. 1A and 1B show a part of a screw compressor casing 10 according to a first embodiment. The casing 10 has a shape capable of accommodating a pair of male and female screw rotors, bearings supporting rotor shafts of the screw rotors, gears provided in ends of the rotor shafts for transmitting drive force between the rotors. The casing 10 includes an oil feeding flow passage 11 for feeding oil for the purpose of lubrication and cooling of the bearings, the gears, and the like. It should be noted that postures of the casing 10 shown in FIGS. 1A and 1B are different from postures at the time of processing in a drilling step to be described later (FIGS. 2A, 2B, 4, 5A, 6A).

The oil feeding flow passage 11 is formed by a cast hole 12, a processed hole (through hole) 13, and a processed hole 14.

Figure 2A:
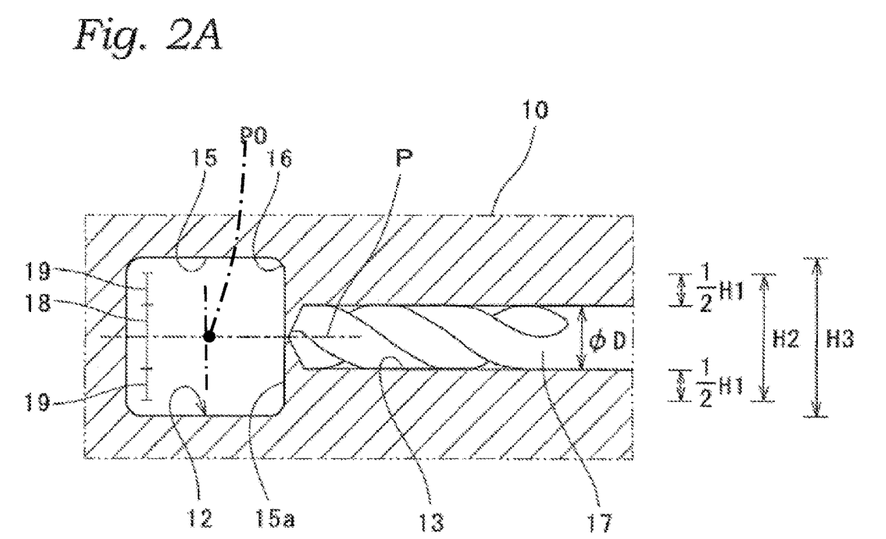
FIG. 2A is a sectional view showing a processed status of the drilled cast with no manufacturing error according to a first embodiment of the present invention.
Figure 2B:
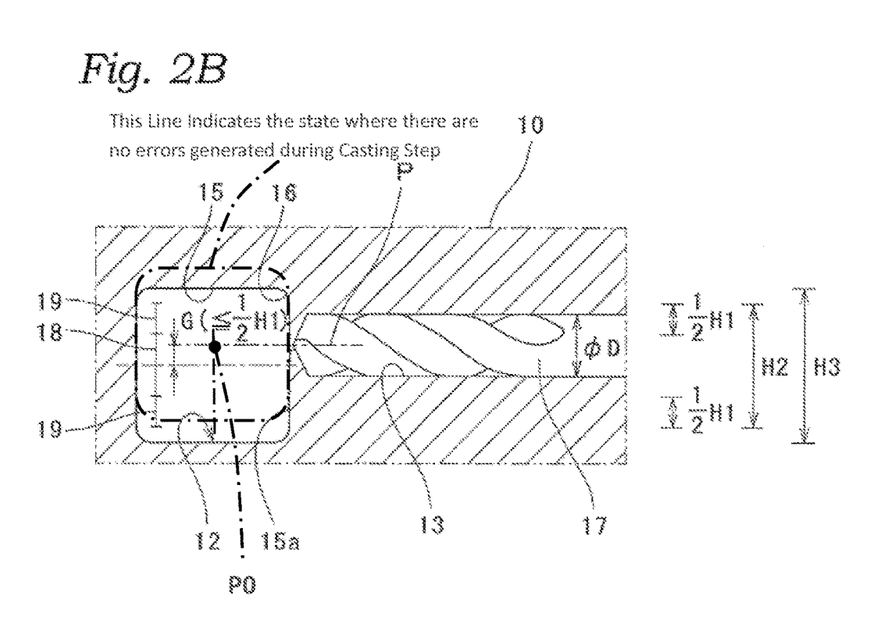
FIG. 2B is a sectional view showing a processed status of the drilled cast with no manufacturing error according to a first embodiment of the present invention.
Figure 3:
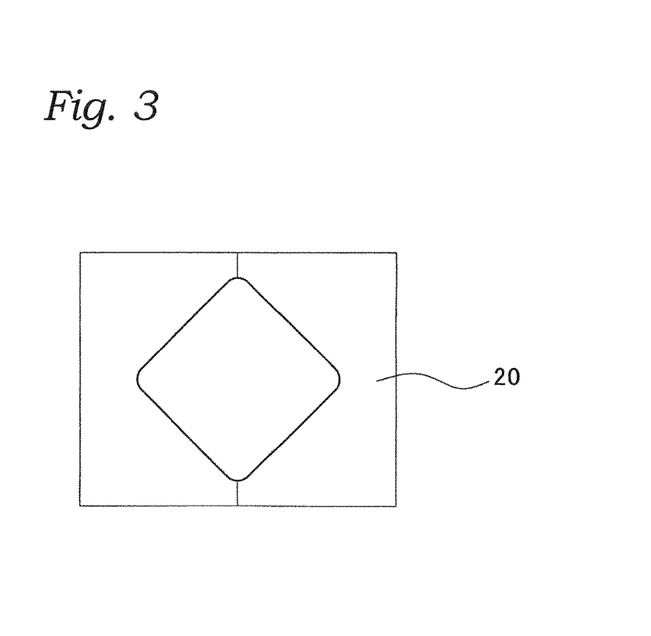
FIG. 3 is a plan view of a core making mold according to the first embodiment of the present invention.

As shown in FIG. 1B, the cast hole 12 is formed so as to pass through from one end of the casing 10 to the other end. The cast hole 12 is formed by casting out by a core installed in a mold to pass through a cast at the time of casting of the casing 10. The cast hole 12 is formed by casting by using the core formed by a core making mold 20 as shown in FIG. 3. As shown in FIG. 2A, the cast hole 12 is defined by flat surface portions 15 and curved surface portions 16. The curved surface portions 16 connected to the flat surface portions 15 are provided in a shape for preventing sand burning or scattering. A sectional shape of a flow passage formed by the cast hole 12 is a substantially regular square. A flat inner wall surface 15a serving as one of the flat surface portions 15 is arranged so as to be orthogonal to axial center of a rotation axis P of a drill 17. A diameter of the drill 17 is D. As shown in FIG. 2A, in the flat inner wall surface 15a, a standard through portion 18 is set at a position in which the drill 17 passes through in a state where a manufacturing error (error in accordance with casting) is not generated in the casing 10. As shown in FIG. 2B, in the flat inner wall surface 15a, displacement tolerance portions 19 are set respectively on the upper side and the lower side of the standard through portion 18 at the time of processing in the drilling step. The displacement tolerance portions 19 are regions not to increase processing resistance of the drill 17 even in a case where the manufacturing error of the cast, that is, displacement of the cast hole 12 due to displacement of the core is generated. It should be noted that in any case of FIGS. 2A and 2B, in order to hole-process to pass through the flat inner wall surface 15a, the rotation axis of the drill 17 is positioned on an extending line in the direction orthogonal to an imaginary center line (design center line) P0 of the cast hole in a case where the displacement of the cast hole (error in accordance with casting) is supposed not to be generated in a casting step. As shown in FIGS. 2A and 2B, when the flat inner wall surface 15a of the casing 10 is arranged so as to be orthogonal to the rotation axis of the drill 17, length of one side in the up and down direction of the flat inner wall surface 15a, that is, width of a position to be drilled with the drill has second length H2 obtained by adding first length H1 serving as a manufacturing error range of the cast to the diameter D of the drill 17. The first length H1 is the sum of length 0.5 H1 of an upper manufacturing error range and length 0.5 H1 of a lower manufacturing error range.

The processed hole 13 is drill-processed and formed with depth six times or more than the drill diameter D so as to pass through the cast hole 12. An axis of the cast hole 12 and an axis of the processed hole 13 are substantially orthogonal to each other. That is, the axis of the cast hole 12 and the axis of the processed hole 13 are positioned within a range of displacement (±0.5 H1 or less) allowed as a manufacturing error with respect to an orthogonal state, and cross at substantially right angle. The processed hole 14 is drill-processed and formed so as to communicate with the processed hole 13. The axis of the processed hole 13 and an axis of the processed hole 14 are substantially orthogonal to each other. The axes of the cast hole 12, the processed hole 13, and the processed hole 14 are positioned on substantially the same plane.

A method for forming drilled cast of the present invention will be described. This method for forming includes the casting step, and the drilling step following the casting step.

The casting step is a conventionally known step of pouring molten metal into a mold in which a core is arranged and casting. The casting step of the present embodiment is to cast the cast having the cast hole 12 which includes the flat inner wall surface 15a arranged so as to be orthogonal to the rotation axis P of the drill 17, the flat inner wall surface whose one side has the second length H2 in the up and down direction.

The drilling step is a step of drilling to form the through hole 13 providing communication between an interior of the cast hole 12 and an exterior of the casing 10 through the flat inner wall surface 15a of the casing 10 with the drill 17. In the drilling step, with respect to the casing 10 set in a drilling device, the rotation axis P of the drill 17 is positioned on the extending line in the direction orthogonal to the imaginary center line P0 of the cast hole in a case where the displacement of the cast hole (error in accordance with casting) is supposed not to be generated in the casting step. That is, by preliminarily bringing a leading end of the drill 17 forward to a point set in the direction of the imaginary center line P0 serving as the design center line of the cast hole, hole-processing to pass through the flat inner wall surface 15a is performed.

FIGS. 2A and 2B show a state where the cast hole 12 of the casing 10 is drill-processed with the drill 17. As shown in FIG. 2A, in a case where the manufacturing error of the cast, that is, the displacement in the up and down direction of the cast hole 12 is not generated in the casing 10, the drill 17 passes through only the standard through portion 18 of the flat inner wall surface 15a. As shown in FIG. 2B, in a case where the manufacturing error of the cast, that is, displacement G in the up and down direction of the cast hole 12 is generated in the casing 10, the drill 17 passes through the standard through portion 18 and the displacement tolerance portions 19. In the casing 10, the displacement tolerance portions 19 are provided on the outer sides of the standard through portion 18. Thus, the drill 17 passes through within a range including the standard through portion 18 and the displacement tolerance portions 19.

According to this method, the flat inner wall surface 15a whose one side has the second length H2 obtained by adding the first length H1 serving as the manufacturing error range of the cast to the diameter D of the drill 17 is formed in the cast hole 12. Thus, even in a case where the manufacturing error is generated in the position of the cast hole 12, the through hole 13 can be reliably provided in the cast hole 12 through the flat inner wall surface 15a.

That is, in the drilling step, with the drill 17 passing through the flat inner wall surface 15a, run-out of the drill 17 due to a difference in the processing resistance of the drill 17 can be prevented, so that damage to the drill 17 can be avoided. A hole requiring a long processing time for drill-processing is formed as the cast hole 12 not requiring the processing time. Thus, deterioration of productivity can be avoided.

The flat inner wall surface 15a is formed within the manufacturing error range set in consideration with the displacement of the cast hole 12. Thus, the through hole 13 can be provided in a projecting manner with respect to center of the cast hole 12. Therefore, there is no need for providing extra thickness to an outer surface of the cast, so that an increase in size of the cast can be avoided. Consequently, a low cost property can be improved.

The drill-processing can be performed to the flat inner wall surface 15a of the cast hole 12. Thus, formation of a projection shape in the flat inner wall surface 15a can be avoided. Therefore, clogging of an oil feeding nozzle due to breakage of the projection shape, damage to precision parts such as bearings, and the like can be avoided, so that a decrease in quality of the device can be avoided.

As described above, the damage to the drill during the drilling of the cast due to the run-out of drill can be avoided, so that the low cost property and the quality can be improved without deteriorating the productivity.

Since the cast hole 12 is formed by using the core, the cast hole 12 can be easily formed in the cast. In a case where the axial length of the cast hole 12 (third length) is L, "length L/diameter D of drill 17" can be 6 or more. Thus, with the drill-processing, by using a long drill, even a long hole requiring a long processing time does not deteriorate the productivity. At this time, the cast hole 12 may be formed by using the core passing through the cast. Thereby, the manufacturing error of the cast can be more reduced, for example, the first length H1 can be made about 4 mm or less (±2 mm or less).

Second Embodiment

A screw compressor casing 10 according to a second embodiment is formed by using a full-mold casting process. The full-mold casting process is, for example, a lost wax process or an evaporative pattern casting process.

The lost wax process is a casting process utilizing melting of a pattern made of wax, the casting process in which molten metal is poured into a mold having a space faithfully copying the wax pattern.

The evaporative pattern casting process is a process in which an evaporative pattern manufactured with synthetic resin foam such as polystyrene foam is embedded in cast sand to form a mold, and by charging molten metal into the evaporative pattern and burning and evaporating the pattern, the evaporative pattern is replaced with the molten metal to cast a cast.

Figure 4:
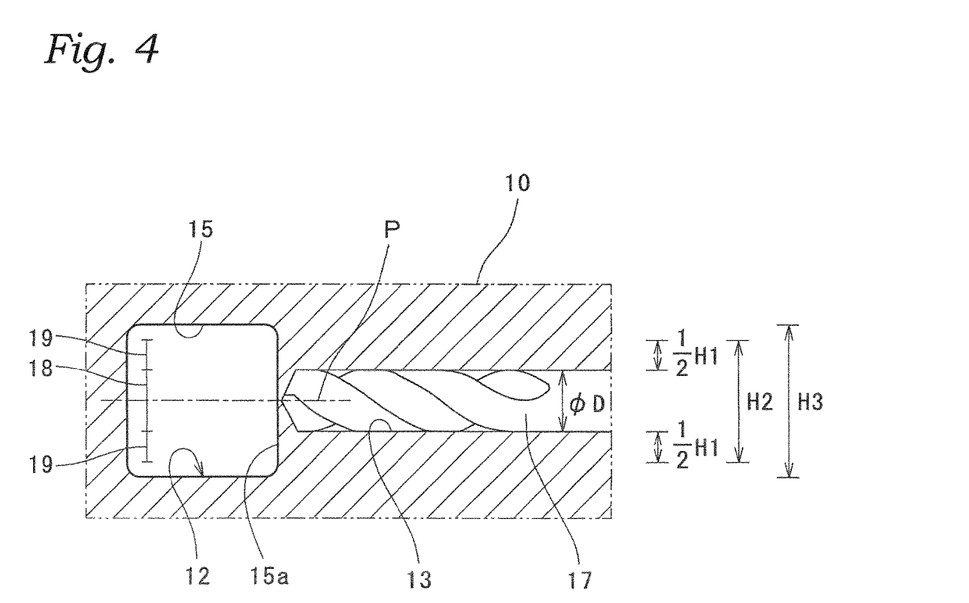
FIG. 4 is a sectional view showing a processed status of the drilled cast with no manufacturing error according to a second embodiment of the present invention.

FIG. 4 shows a state where a cast hole 12 of the casing 10 in the second embodiment is drill-processed with a drill 17. In this example, only a method for forming the cast hole 12 is different from the first embodiment, and a shape of the cast hole 12 is the same as the first embodiment. In the present embodiment, a point where a standard through portion 18 and displacement tolerance portions 19 are provided in a flat inner wall surface 15a is the same as the first embodiment, and effects obtained by the point are also the same. Thus, description thereof will be omitted.

According to this method, in comparison to the method in which the core is installed, a cast with favorable size precision can be manufactured. Thus, thickness of the cast can also be suppressed, and cost can be suppressed to a minimum. Further, according to the method for forming the cast hole 12 by using the evaporative pattern passing through the cast, in comparison to a case where the cast hole is formed by using the core passing through the cast, an error of the cast can be more reduced, and displacement of the cast hole 12 is small. Thus, length of one side of the cast hole 12 can be suppressed to a minimum, for example, first length H1 can be made about 3 mm or less (±1.5 mm or less). In a case of a cast hole not passing through a cast, in a conventionally known step of manufacturing the cast by using a wood pattern or a metal pattern, a main pattern may sometimes have a shape for forming a cast hole. In this case, in order to easily remove the wood pattern, the metal pattern, or the like from cast sand or the like, there is a need for forming a taper part along the axial direction of the cast hole. However, according to the full-mold casting process, such a need for forming the taper part can be eliminated. Therefore, a relatively long non-through cast hole having the same sectional shape can be made.

Figure 5A:
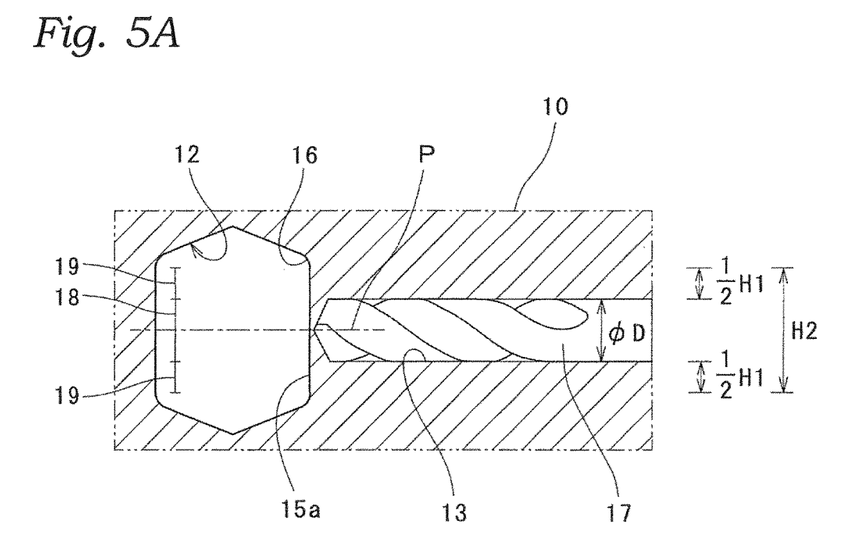
FIG. 5A is a sectional view of a modification of the present invention.
Figure 5B:
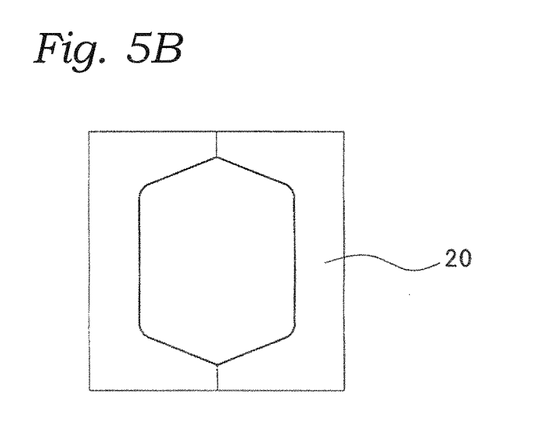
FIG. 5B is a plan view of a core making mold used for the modification of the present invention.
Figure 6A:
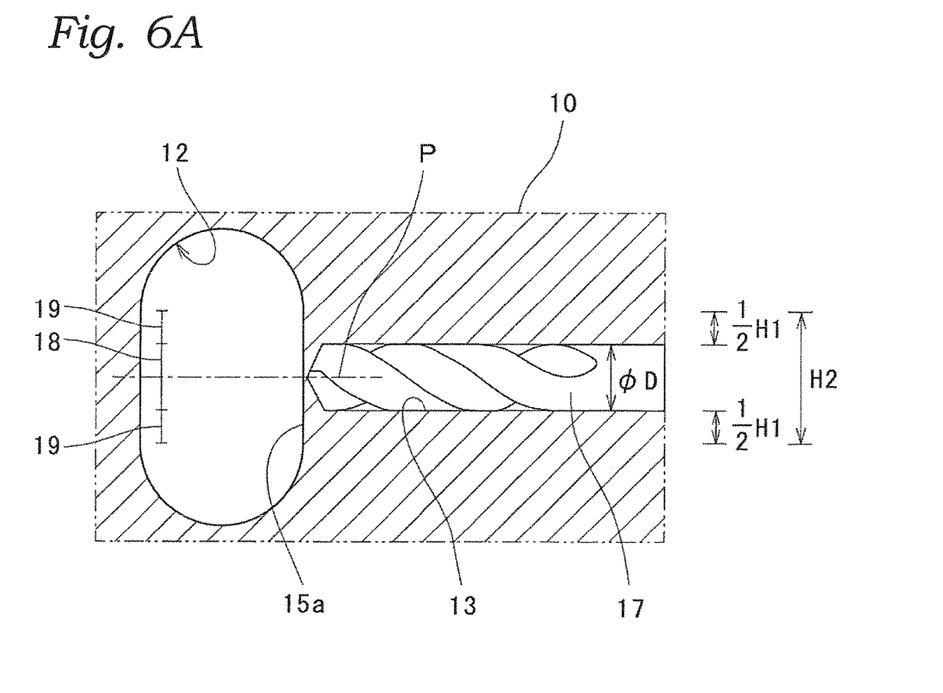
FIG. 6A is a sectional view of a modification of the present invention.
Figure 6B:
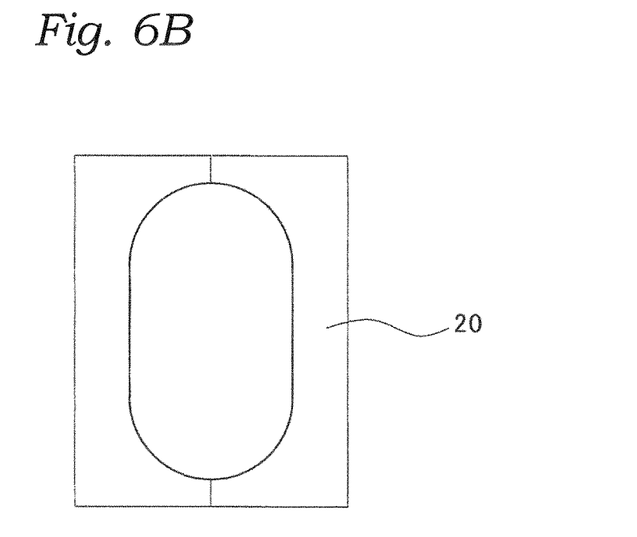
FIG. 6B is a core making mold used for the modification of the present invention.

It should be noted that the method for forming the drilled cast of the present invention is not limited to the above embodiments and various modifications can be made. For example, the casting step of the present invention may be to cast a cast having a cast hole which includes a flat inner wall surface 15a in which width of a position to be drilled with a drill 17 has second length H2 obtained by adding 4 mm at a maximum as first length H1 serving as a manufacturing error range of the cast to a diameter D of the drill 17. A shape of an opening of the oil feeding flow passage 11 may be any shape as long as the shape has the flat inner wall surface 15a. As shown in FIG. 5A, a shape of an opening of the cast hole 12 may be a vertically-long hexagon. The oil feeding flow passage 11 having a vertically-long hexagonal opening shape is formed by using a core making mold 20 shown in FIG. 5B. As shown in FIG. 6A, the shape of the opening of the cast hole 12 may be a long circle including two semi-circular portions of equal size and two straight line portions smoothly connecting these semi-circular portions. The oil feeding flow passage 11 having a long-circle opening shape is formed by using a core making mold 20 shown in FIG. 6B.

The invention claimed is:

1. A method for forming drilled cast which includes drilling with a drill so as to provide communication with a cast hole, comprising:
    a casting step of casting a cast having the cast hole which includes a flat inner wall surface to be drilled with the drill to form a through hole;
    a step of positioning the drill against the cast such that a rotational axis of the drill is set in perpendicular to the flat inner wall surface of the cast hole; and
    a drilling step of drilling with the drill through the flat inner wall surface to form the through hole on the flat inner wall providing communication between an interior of the cast hole and an exterior of the cast, wherein
    a relative size between the diameter D of the drill and a width dimension H2 of the flat inner surface of the cast hole is set such that H2=H1+D, where H1=a manufacturing error range of the casting step.

2. The method for forming drilled cast according to claim 1, wherein
    in the drilling step, the rotation axis of the drill is positioned on an extending line in the direction orthogonal to an imaginary center line of the cast hole in a case where the manufacturing error of the cast hole with respect to the cast is not generated in the casting step.

3. The method for forming drilled cast according to claim 2, wherein in the drilling step, the axial length of the through hole providing communication between the interior of the cast hole and the exterior of the cast is six times or more than the diameter D of the drill.

4. The method for forming drilled cast according to claim 1, wherein the cast hole is formed by using a core.

5. The method for forming drilled cast according to claim 1, wherein the cast hole is formed by using a full-mold casting process.

6. The method for forming drilled cast according to claim 5, wherein the cast hole is formed by using an evaporative pattern passing through the cast in the full-mold casting process.

7. The method for forming drilled cast according to claim 4, wherein the cast hole is formed by using a core passing through the cast.

8. The method for forming drilled cast according to claim 7, wherein H1 is set to be 4 mm at a maximum.

* * * * *